(12) United States Patent
Bouchy et al.

(10) Patent No.: US 7,736,492 B2
(45) Date of Patent: *Jun. 15, 2010

(54) SELECTIVE HYDROGENATION PROCESS EMPLOYING A CATALYST WITH A SPECIFIC SUPPORT

(75) Inventors: Christophe Bouchy, Lyons (FR); Florent Picard, Communay (FR); Nathalie Marchal, Saint Genis Laval (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 406 days.

This patent is subject to a terminal disclaimer.

(21) Appl. No.: 11/642,974

(22) Filed: Dec. 21, 2006

(65) Prior Publication Data

US 2007/0187297 A1  Aug. 16, 2007

(30) Foreign Application Priority Data

Dec. 22, 2005  (FR) .................................. 05 13173

(51) Int. Cl.
*C07C 7/163* (2006.01)

(52) U.S. Cl. ........................ 208/143; 208/108; 208/112; 208/144; 208/145; 208/208 R; 208/209

(58) Field of Classification Search ................. 208/108, 208/112, 143–145; 502/335, 524
See application file for complete search history.

(56) References Cited

U.S. PATENT DOCUMENTS

| | | | |
|---|---|---|---|
| 3,472,763 A | 10/1969 | Cosyns et al. | |
| 4,456,703 A * | 6/1984 | Aldridge | 502/335 |
| 2003/0217951 A1* | 11/2003 | Marchal-George et al. | 208/210 |
| 2004/0007503 A1* | 1/2004 | Uzio et al. | 208/216 R |
| 2004/0007504 A1* | 1/2004 | Uzio et al. | 208/216 R |
| 2004/0226863 A1 | 11/2004 | Uzio et al. | |
| 2005/0061712 A1* | 3/2005 | Nicolaos et al. | 208/208 R |
| 2007/0170098 A1 | 7/2007 | Bouchy et al. | |
| 2007/0173674 A1 | 7/2007 | Bouchy et al. | |

FOREIGN PATENT DOCUMENTS

| | | |
|---|---|---|
| GB | 1 379 202 A | 1/1975 |
| GB | 1 415 417 A | 11/1975 |

OTHER PUBLICATIONS

Zielinski, J. (1992). Catalysis Letters, 12, 389-393.*
Wang X et al., Effect of Pre-Treated Conditions on the Performance of Sulfieded Ni-M0/Gamma-A1203 Catalysts for Hydrogenation of Linear Aldehydes, Journal of Molecular Catalysis, (May 3, 2005), pp. 101-112, vol. 232, No. 1-2, Amsterdam NL.
Sun M et al, Theoretical Investigations of the Structures and Prosperities of Molybdenum-based Sulfide Catalysts, Applied Catalysis, (Jun. 10, 2004), pp. 131-143, vol. 263, No. 2, Amsterdam, NL.
Toba M. et al., Selective Hydrodesulfurization of FCC Gasoline Over CoMo/A1203 Sulfide Catalyst Catalysis Today, (Jun. 15, 2005), pp. 64-69, vol. 104, No. 1.
Sonja Eijsbouts, Review on the Flexibility of the Active Phase In Hydrotreatig Catalyst, Applied Catalysis, (1997), pp. 53-92, vol. 158, Amsterdam, NL.

* cited by examiner

*Primary Examiner*—Robert J Hill, Jr.
*Assistant Examiner*—Brian McCaig
(74) *Attorney, Agent, or Firm*—Millen, White, Zelano & Branigan, P.C.

(57) ABSTRACT

A process for jointly carrying out selective hydrogenation of polyunsaturated compounds into monounsaturated compounds contained in gasolines, and for transforming light sulphur-containing compounds into heavier compounds by reaction with unsaturated compounds, said process employing a supported catalyst comprising at least one metal from group VIB and at least one non-noble metal from group VIII used in the sulphurized form, deposited on a specific support comprising a metal aluminate of the $MAl_2O_4$ type with a metal M selected from the group constituted by nickel and cobalt, and comprising bringing the feed into contact with the catalyst at a temperature in the range of 80° C. to 220° C. at a liquid hourly space velocity in the range of 1 $h^{-1}$ to 10 $h^{-1}$ and at a pressure in the range of 0.5 to 5 MPa.

23 Claims, 3 Drawing Sheets

Ordinate: Residual MAV (mg/g)

SELECTIVE HYDROGENATION PROCESS EMPLOYING A CATALYST WITH A SPECIFIC SUPPORT

FIELD OF THE INVENTION

The production of gasoline satisfying new environmental specifications requires a large reduction in their sulphur content to values which generally do not exceed 50 ppm and are preferably less than 10 ppm.

It is also known that conversion gasolines, more particularly those from catalytic cracking, which may represent 30% to 50% of the gasoline pool, have high olefin and sulphur contents.

Thus, almost 90% of the sulphur present in the gasoline can be attributed to gasolines from catalytic cracking processes, hereinafter termed FCC gasoline (fluid catalytic cracking). FCC gasolines thus constitute the preferred feed for the process of the present invention.

More generally, the process of the invention is applicable to any gasoline cut containing a certain proportion of diolefins and which may also contain several lighter compounds from C3 and C4 cuts.

Gasolines from cracking units are generally rich in olefins and sulphur, but also in diolefins in an amount, for gasolines from catalytic cracking, of 1% by weight to 5% by weight. Diolefins are unstable compounds which polymerize easily and must generally be eliminated before processing those gasolines, such as by using hydrodesulphurization treatments intended to satisfy specifications regarding the amount of sulphur in gasolines. However, that hydrogenation must be selectively applied to diolefins to limit the hydrogenation of olefins and to limit the consumption of hydrogen and the octane loss of the gasoline. Further, as described in EP-A1-1 077 247, it is advantageous to transform saturated light sulphur-containing compounds, which are sulphur-containing compounds with a boiling point lower than that of thiophene, such as methanethiol, ethanethiol or dimethylsulphide, into heavier compounds before the desulphurization step, as that can produce a desulphurized gasoline fraction mainly composed of olefins containing 5 carbon atoms without a loss of octane by simple distillation. The sulfur content in the feedstock after selective hydrogenation and the transformation of light sulphur-containing compounds into heavier compounds is not modified, only the nature of the sulfur is modified due to the transformation of light sulphur-containing compounds into heavier compounds.

Further, the diene compounds present in the feed to be treated are unstable and tend to form gums by polymerizing. Such gum formation causes progressive deactivation of the selective hydrogenation catalyst or progressive plugging of the reactor. For industrial application, it is thus important to use catalysts which limit the formation of polymers, i.e. catalysts having a low acidity or wherein the porosity is optimized to facilitate continuous extraction of polymers or gum precursors by the hydrocarbons of the feed, to ensure a maximum life cycle for the catalyst.

The present invention proposes the use of a novel catalyst in a process that can jointly carry out hydrogenation of polyunsaturated compounds, and more particularly of diolefins, and transform light sulphur-containing compounds, more particularly mercaptans, into heavier compounds.

One advantage of the invention is to facilitate sulphur elimination by transforming mercaptans into heavier compounds to separate them more easily and thus eliminate them in a subsequent hydrodesulphurization step.

Another advantage of the invention is to produce a gasoline having a high octane index.

A third advantage of the invention resides in the fact that the catalyst formulation is adjusted to ensure better stability of the catalyst as regards polymer formation, good selectivity as regards diolefin hydrogenation and good activity in the conversion of mercaptans and other light sulphur-containing compounds.

PRIOR ART

The literature describes catalytic formulations or processes which can either selectively hydrogenate diolefins to olefins or transform mercaptans by transforming them into heavier compounds, or carry out these two types of reaction in one or two steps.

The use of catalysts containing at least one noble metal is known. Many patents propose catalysts for selective hydrogenation which contain palladium. Palladium is known for its hydrogenating activity and is widely used in selective hydrogenation processes. However, palladium is sensitive to poisons and in particular to the presence of sulphur. The present invention differs from those catalysts in that the catalyst of the invention contains no palladium and, more broadly, contains no noble metals.

European patent application EP-A1-0 685 552 proposes a process for hydrogenating diolefins and reducing the mercaptans content of a catalytically cracked gasoline based on a catalyst containing between 0.1% and 1% by weight of palladium.

European patent application EP-A1-0 623 387 proposes a catalyst comprising at least one group VIII metal preferably selected from platinum, palladium and nickel and at least one additional metal M preferably selected from the group formed by germanium, tin, lead, titanium, iron, molybdenum, tungsten and rhenium. The catalyst is characterized in that the group VIII metal is activated by reduction in the reactor before introducing the metal M. The catalyst of the present invention differs from that patent in that it does not undergo reduction during the preparation phase.

The following patents and patent applications propose solutions for selectively hydrogenating diolefins; reactions which may affect sulphur-containing compounds, if they are present, are not mentioned.

U.S. Pat. No. 6,469,223 concerns a process for selective hydrogenation of diolefins on a catalyst containing nickel and molybdenum on an alumina-based support. The process is characterized in that the nickel and molybdenum metals are used in the form of oxides. The present invention differs from that prior art in that the metals are used in the form of metal sulphides rather than oxides.

U.S. Pat. No. 3,472,763 proposes a process for selective hydrogenation involving a nickel-based catalyst supported on alumina. The catalyst may also, and preferably, contain between 1% and 10% of molybdenum. That catalyst is also characterized by a pore distribution such that the total pore volume is more than 0.4 $cm^3/g$, with 40% to 80% of that volume corresponding to pores with a diameter of more than 0.05 and wherein pores with a diameter in the range 0.05 to 1 micron represent more than 20% of the pore volume. That patent also teaches that it is preferable to reduce the metals before their partial sulphurization. The catalyst of the present invention differs from that prior art primarily in the amount of molybdenum, which is over 10% by weight, and by the sulphurization step which is carried out on the metals in the oxide state.

The following patents and patent applications propose solutions to transform the mercaptans into heavier compounds by thioetherification reactions, and optionally to selectively hydrogenate diolefins.

U.S. Pat. No. 5,807,477 proposes a process which, in a first step, can transform mercaptans into sulphides by addition to diolefins on a catalyst comprising a group VIII metal, preferably nickel, in the oxide form, then in a second step, selectively hydrogenating the diolefins in a reactive distillation column in the presence of hydrogen. The present invention differs from that patent in that the selective hydrogenation and steps for transforming the sulphur-containing compounds into heavier compounds are carried out jointly on the same catalyst used in the sulphurized form.

U.S. Pat. No. 5,851,383 describes a process for selective hydrogenation and thioetherification of C3-C5 cuts characterized by a distillation apparatus comprising two fractionation zones which can separately recover the light compounds and the thioethers. The catalysts described are either catalysts based on a group VIII metal or resins containing a metal. A catalyst containing between 15% and 35% of nickel is preferred. The catalyst of the present invention differs from the catalyst in that patent as the hydrogenation metal is a group VIB metal and the nickel content is less than 15% by weight.

In the light of the solutions described in the literature, the present invention proposes a process using a catalyst with a specific support which can jointly carry out hydrogenation of polyunsaturated compounds, more particularly diolefins, and transform light sulphur-containing compounds, more particularly mercaptans, into heavier compounds

BRIEF DESCRIPTION OF THE INVENTION

The present invention describes a process for selective hydrogenation of polyunsaturated compounds, more particularly diolefins, which can jointly transform saturated light sulphur-containing compounds, more particularly mercaptans, into heavier compounds, said process employing a catalyst containing at least one metal from group VIB and at least one non-noble metal from group VIII deposited on a support comprising a metal aluminate of the $MAl_2O_4$ type in which the metal M is selected from the group constituted by nickel and cobalt and such that the quantity of metal M which interacts strongly with the support is in the range 0.5% to 10% by weight of metal oxide with respect to the total catalyst weight, and in which:
  the amount, by weight of oxide, of the group VIB element is strictly greater than 12% by weight with respect to the total catalyst weight;
  the amount, by weight of oxide, of the group VIII element is less than 15% by weight with respect to the total catalyst weight;
  the degree of sulphurization of the constituent metals of said catalyst is at least 60%;
  the volume of pores with a diameter of more than 0.05 microns is in the range 10% to 40% of the total pore volume.

The process consists of passing a mixture, constituted by the gasoline to be treated and hydrogen, over the catalyst.

The hydrogen is generally introduced in a slight excess, up to 5 moles per mole, with respect to the stoichiometry necessary to hydrogenate the diolefins (one mole of hydrogen per mole of diolefin).

The mixture constituted by gasoline and hydrogen is brought into contact with the catalyst at a pressure in the range 0.5 to 5 MPa, a temperature in the range 80° C. to 220° C., with a liquid hourly space velocity (LHSV) in the range 1 $h^{-1}$ to 10 $h^{-1}$, the liquid hourly space velocity being expressed in litres of feed per litre of catalyst per hour (1/l/h).

DETAILED DESCRIPTION OF THE INVENTION

The invention concerns a process for the treatment of gasolines comprising any type of chemical family, in particular diolefins, olefins and sulphur-containing compounds in the form of mercaptans and light sulphides. The present invention is of particular application in the transformation of conversion gasolines, in particular gasolines from catalytic cracking, fluidized bed catalytic cracking (FCC), a cokefaction process, a visbreaking process, or a pyrolysis process. Feeds to which the invention is applicable have a boiling point in the range 0° C. to 280° C., more precisely between 30° C. and 250° C. The feeds may also comprise hydrocarbons containing 3 or 4 carbon atoms.

As an example, gasolines from catalytic cracking units (FCC) contain, on average, between 0.5% and 5% by weight of diolefins, between 20% and 50% by weight of olefins, and between 10 ppm and 0.5% by weight of sulphur, generally including less than 300 ppm of mercaptans. The mercaptans are generally concentrated in the light gasoline fractions and more precisely in the fraction with a boiling point of less than 120° C.

Treatment of the gasoline described in the present process principally consists of:
  selectively hydrogenating the diolefins to olefins;
  transforming the light saturated sulphur-containing compounds, and principally mercaptans, into heavier sulphides or mercaptans by reaction with the olefins.

The hydrogenation of diolefins to olefins is illustrated below by the transformation of 1,3-pentadiene, which is an unstable compound which easily polymerizes, into pent-2-ene by addition of hydrogen. However, secondary olefin hydrogenation reactions must be limited since, as shown in the example below, they would result in the formation of n-pentane.

The sulphur-containing compounds which are to be transformed are principally mercaptans and sulphides. The principal mercaptan transformation reaction consists of thioetherification of olefins by mercaptans. This reaction is illustrated below by the addition of propane-2-thiol to pent-2-ene to form a propylpentylsulphide.

In the presence of hydrogen, sulphur-containing compound transformation may also be carried out by the intermediate formation of $H_2S$ which may then add to unsaturated compounds present in the feed. However, this is a minor pathway under the preferred reaction conditions.

In addition to mercaptans, the compounds which may be transformed into heavier compounds are sulphides and principally dimethylsulphide, methylethylsulphide and diethylsulphide, $CS_2$, COS, thiophane and methylthiophane.

In certain cases, it is also possible to observe reactions for transforming light nitrogen-containing compounds, principally nitrites, pyrrole and its derivatives, into heavier compounds.

The process described in the present invention consists of bringing the feed to be treated, mixed with a stream of hydrogen, into contact with a catalyst containing at least one metal from group VIB (group 6 in the new periodic table notation: Handbook of Chemistry and Physics, 76$^{th}$ edition, 1995-1996) and at least one non-noble group VIII metal (groups 8, 9 and 10 of said classification), deposited on a support comprising a metal aluminate of the $MAl_2O_4$ type in which the metal M is selected from the group constituted by nickel and cobalt, such that the quantity of metal M which interacts strongly with the support is in the range 0.5% to 10% by weight with respect to the total catalyst weight, preferably in the range 0.7% to 8% by weight and more preferably in the range 1% to 5% by weight with respect to the total catalyst weight.

In order to determine the quantity of metal M in strong interaction with the support, the temperature-programmed reduction method, TPR, is used.

TPR consists of using a Constructeur Micromeritics Autochem 2920 type apparatus, introducing 0.5 g of catalyst ground into the 300-500 micron fraction into a quartz cell, passing a gas mixture composed of 5% $H_2$ and 95% Ar (argon is the reference gas) at a flow rate of 20 ml/min, and progressively increasing the temperature. The temperature rise conditions are as follows:

temperature ramp-up: 5° C./min to 1000° C.; and
constant temperature stage at 1000° C. for 1 h.

The water, $H_2O$, which is formed is trapped using a molecular sieve, for example of the zeolite trap type.

Figure 1:
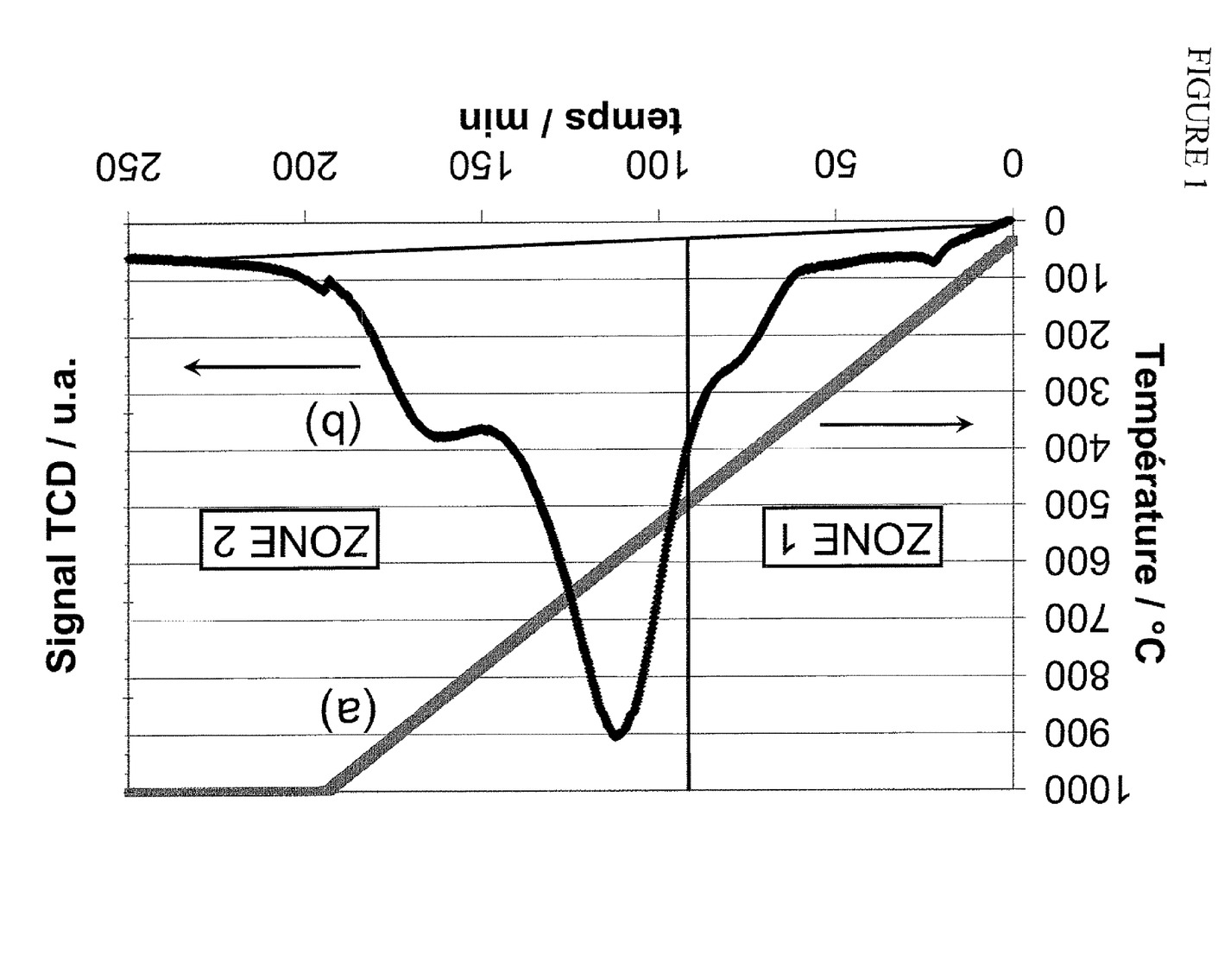
FIG. 1 is a graph showing a programmed temperature reduction temperature-programmed reduction of a support with curves representing a change of temperature T (° C.) and hydrogen consumption and a function of time.

FIG. 1 shows a TPR of a support comprising nickel oxide and nickel aluminate (AlNi). Curve a) represents the change in temperature T (° C.) as a function of the time (mm) and curve b) represents the hydrogen consumption as a function of time (mm) measured by chromatography using a chromatograph provided with a TCD (thermo conductivity detector).

The results of the temperature-programmed reduction are shown in FIG. 1 for the AlNi support. Two zones can be distinguished on the Figure:

zone 1 corresponds to reduction of a fraction of the nickel which can be reduced at low temperature, i.e. interacting weakly with the alumina at low temperature, said fraction being capable of being reduced at a temperature of less than 500° C. under the conditions indicated above. Thus, it is free nickel oxide, which is not incorporated into the support;

zone 2 corresponds to the fraction of nickel which can be reduced at high temperature, i.e. interacting strongly with the alumina, i.e. either nickel oxide particles which interact strongly with alumina and can which be reduced at temperatures in the range 500° C. to 750° C. under the conditions indicated above, or nickel oxide engaged in a spinel type nickel aluminate structure, $NiAl_2O_4$ (capable of being reduced at a temperature of more than 750° C. under the conditions indicated above).

Integrating the areas under the peaks in zones 1 and 2, the area of each peak being proportional to the quantity of hydrogen consumed, provides an estimate of the quantity of nickel oxide which interacts weakly or strongly with the alumina.

In FIG. 1, the areas of FIGS. 1 and 2 are as follows:
area of zone 1 (weak interaction): 24%;
area of zone 2 (strong interaction): 76%.

The catalyst is then prepared as will be described below.

It has been established that catalyst performance is improved when the catalyst has the following characteristics:

The amount, by weight of the oxide, of the group VIB element in the oxide form is strictly more than 12% by weight, and preferably strictly pore than 14%. The group VIB metal is preferably selected from molybdenum and tungsten. More preferably, the group VIB metal is molybdenum.

The catalyst also contains a non-noble group VIII metal, preferably selected from nickel, cobalt and iron. More preferably, the non-noble group VIII metal is constituted by nickel. The amount of non-noble group VIII metal, expressed in the oxide form, is less than 15% by weight with respect to the total catalyst weight and is preferably in the range 1% by weight to 10% by weight with respect to the total catalyst weight.

The mole ratio between the non-noble group VIII metal and the group VIB metal is preferably in the range 0.2 to 0.5 mol/mol, more preferably in the range 0.25 to 0.45 mol/mol. When the non noble group VIII metal used is Ni or Co, the calculated mole ratio does not take the Ni or Co engaged during preparation of the support into account.

Preferably, a catalyst is used with a total pore volume, measured by mercury porosimetry, in the range 0.3 to 0.7 cm$^3$/g and highly preferably in the range 0.35 to 0.65 cm$^3$/g. Mercury porosimetry is carried out using the ASTM D4284-92 standard with a wetting angle of 140°, using an Autopore III model from Micromeritics.

The specific surface area of the catalyst is preferably less than 250 m$^2$/g, more preferably in the range 30 m$^2$/g to 150 m$^2$/g.

Further, the pore volume of the catalyst, measured by mercury porosimetry, of pores with a diameter of more than 0.05 microns, is in the range 10% to 40% of the total pore volume and is preferably in the range 15% to 35% of the total pore volume.

The volume of pores of the catalyst with a diameter of more than 0.1 microns is preferably in the range 5% to 35% of the total pore volume, more preferably in the range 10% to 30% of the total pore volume. The inventors have observed that this pore distribution limits gum formation in the catalyst.

The volume of pores of the catalyst with a diameter between 0.004 and 0.009 microns represents preferably 5 to 12% of the total pore volume and more preferably 8 to 10% of the total pore volume.

The catalyst support comprises a $MAl_2O_4$ type metal aluminate where M is selected from the group constituted by nickel and cobalt; preferably, M is nickel.

Preferably, a support having a total pore volume, measured by mercury porosimetry, in the range 0.3 to 0.7 cm$^3$/g, preferably in the range 0.35 to 0.65 cm$^3$/g, is used.

Further, the pore volume of the support, measured by mercury porosimetry, of pores with a diameter of more than 0.05 micron is preferably in the range 5% to 50% of the total pore volume, more preferably in the range 10% to 40% of the total pore volume.

The volume of pores of the support with a diameter of more than 0.1 microns is preferably in the range 5% to 35% of the total pore volume, more preferably in the range 5% to 30% of the total pore volume.

The specific surface area of the support is preferably less than 250 m²/g, more preferably in the range 30 m²/g to 150 m²/g.

A preferred implementation of the invention corresponds to using a catalyst containing an amount of nickel oxide in the range 1% to 10% with respect to the total catalyst weight, a molybdenum oxide content of more than 12% with respect to the total catalyst weight and a nickel/molybdenum mole ratio in the range 0.25 to 0.45, the metals being deposited on a support comprising a nickel aluminate wherein the quantity of metal M which interacts strongly with the support is in the range 1% to 5% by weight of the metal oxide with respect to the total catalyst weight, the degree of sulphurization of the metals constituting the catalyst being more than 80% and the volume of pores of said catalyst with a diameter of more than 0.05 microns being in the range 15% to 35%.

Preferably, the catalyst of the invention does not contain any halogen and particularly any fluor.

Preferably, the catalyst of the invention under its oxide form and before catalytic test does not contain any carbon.

Preparation Method

Step 1: Synthesis of Support

The support of the invention comprises alumina, for example an alumina with a high specific surface area. The support may also be constituted by a mixture of alumina and any other oxide which is known to the skilled person, for example silica, titanium oxide, magnesium oxide, zinc oxide or zirconium oxide. The alumina used is selected from alumina groups which can incorporate a metal M such as nickel and cobalt. In particular, it is gamma alumina, delta alumina or an alumina, preferably a gamma alumina. This alumina is dry impregnated with an aqueous solution containing a suitable quantity of metal nitrate such as nickel nitrate or cobalt nitrate. In accordance with the invention, the quantity of metal nitrate corresponds to a metal content (in equivalents of oxide, MO, with M selected from the group constituted by nickel and cobalt) of 0.5% to 10% by weight with respect to the total catalyst weight, preferably in the range 0.7% to 8% by weight and more preferably in the range 1% to 5% by weight on the solid. After impregnation, the solid is left to mature at ambient temperature for 12 hours, and dried at 120° C. for 12 hours. Finally, the solid is calcined at 750° C. for two hours in a muffle furnace; this solid is hereinafter denoted AlNi or AlCo. Preferably, a maximum of 40% of the quantity of metal M used in this step for synthesis of the support interacts weakly with said support, preferably a maximum of 30%, and more preferably a maximum of 25%.

Step 2: Preparation of Catalyst

The catalyst of the invention may be prepared using any technique which is known to the skilled person, in particular by impregnating elements from groups VIII and VIB onto the selected support. Said impregnation may, for example, be carried out using the technique known to the skilled person as dry impregnation, in which exactly the desired quantity of elements is introduced in the form of salts which are soluble in the selected solvent, for example demineralized water, to fill the porosity of the support as exactly as possible. The support, which is by then filled with solution, is preferably dried. The preferred support is alumina, which may be prepared from any type of precursor and shaping tools which are known to the skilled person.

After introducing the group VIII and VIB elements, it undergoes an activation treatment. This treatment generally aims to transform the molecular precursors of the elements into the oxide phase. In this case, it is an oxidizing treatment, but simple drying of the catalyst may also be carried out. In the case of an oxidizing treatment, also termed calcining, this is generally carried out in air or in diluted oxygen, and the treatment temperature is generally in the range 200° C. to 550° C., preferably in the range 300° C. to 500° C. Examples of salts of group VIB and VIII metals which may be used in the catalyst preparation process are cobalt nitrate, nickel nitrate, ammonium heptamolybdate and ammonium metatungstate. Any other salt which is known to the skilled person which has sufficient solubility and which can decompose during the activation treatment may also be used.

Step 3: Sulphurization of Catalyst

After calcining, the metals deposited on the support are in the oxide form. In the case of nickel and molybdenum, the metals are principally in the $MoO_3$ and $NiO$ forms. Before contact with the feed to be treated, the catalysts undergo a sulphurization step. Sulphurization is preferably carried out in a sulphoreducing medium, i.e. in the presence of $H_2S$ and hydrogen, to transform metal oxides into sulphides such as $MoS_2$ and $Ni_3S_2$, for example. Sulphurization is carried out by injecting a stream containing $H_2S$ and hydrogen, or a sulphur-containing compound which can decompose into $H_2S$ in the presence of catalyst and hydrogen, over the catalyst. Polysulphides such as dimethyldisulphide are $H_2S$ precursors which are routinely used to sulphurize catalysts. The temperature is adjusted so that the $H_2S$ reacts with metal oxides to form metal sulphides. Said sulphurization may be carried out in situ or ex situ (outside or inside the reactor) with respect to the hydrodesulphurization reactor at temperatures in the range 200° C. to 600° C. and more preferably in the range 300° C. to 500° C. In order to be active, the metals have to be substantially sulphurized. An element is considered to be "substantially" sulphurized when the mole ratio between the sulphur (S) present on the catalyst and said element is at least 60% of the theoretical mole ratio corresponding to total sulphurization of the element under consideration:

$(S/element)_{catalyst} \geq 0.6 \times (S/element)_{theory}$ in which:

$(S/element)_{catalyst}$ is the mole ratio between the sulphur (S) and the element present on the catalyst, with the exclusion of the metal (Ni or CO) used during preparation of the support;

$(S/element)_{theory}$ is the mole ratio between the sulphur and the element corresponding to total sulphurization of the element to the sulphide.

This theoretical mole ratio depends on the element under consideration:

$(S/Fe)_{theory} = 1$ $(S/CO)_{theory} = 8/9$ $(S/Ni)_{theory} = 2/3$ $(S/Mo)_{theory} = 2/1$ $(S/W)_{theory} = 2/1$ If the catalyst comprises a plurality of metals, the mole ratio between the S present on the catalyst and the assembled elements must also be at least 60% of the theoretical mole ratio corresponding to total sulphurization of each element to the sulphide, the calculation being carried out pro rata for the relative mole fractions of each element, with the exclusion of the metal (Ni or Co) engaged during preparation of the support.

As an example, for a catalyst comprising molybdenum and nickel with a respective mole fraction of 0.7 and 0.3, the minimum mole ratio (S/Mo+Ni) is given by the relationship:

$$(S/MO+Ni)_{catalyst} = 0.6 \times \{(0.7 \times 2) + (0.3 \times (2/3))\}$$

Highly preferably, the degree of sulphurization of the metals is more than 80%.

Sulphurization is carried out on metals in the oxide form without carrying out a prior metal reduction step. Sulphurizing reduced metals is known to be more difficult than sulphurizing metals in the oxide form.

In the selective hydrogenation process of the invention, the feed to be treated is mixed with hydrogen before being brought into contact with the catalyst. The quantity of hydrogen which is injected is such that the mole ratio between the hydrogen and the diolefins to be hydrogenated is more than 1 (stoichiometry) and less than 10, preferably in the range 1 to 5 mol/mol. Too large an excess of hydrogen may cause too much hydrogenation of olefins and as a result, reduce the octane number of the gasoline. The whole feed is generally injected into the reactor inlet. However, it may be advantageous in some cases to inject a fraction or all of the feed between two consecutive catalytic beds placed in the reactor. This implementation can allow the reactor to continue operating if the inlet to the reactor is blocked with deposits of polymers, particles or gums present in the feed.

The mixture constituted by gasoline and hydrogen is brought into contact with the catalyst at a temperature in the range 80° C. to 220° C., preferably in the range 90° C. to 200° C., with a liquid hourly space velocity (LHSV) in the range 1 $h^{-1}$ to 10 $h^{-1}$. The pressure is adjusted so that the reaction mixture is mainly in the liquid form in the reactor. The pressure is in the range 0.5 MPa to 5 MPa and is preferably in the range 1 to 4 MPa.

The gasoline treated under the conditions mentioned above has a reduced diolefins and mercaptans content. Generally, the gasoline produced contains less than 1% by weight of diolefins and preferably less than 0.5% by weight of diolefins. The amount of light sulphur-containing compounds with a boiling point less than that of thiophene (84° C.) which is generally converted is more than 50%. Thus, it is possible to separate the light fraction of the gasoline by distillation and to send said fraction directly to the gasoline pool without complementary treatment. The light fraction of the gasoline generally has an end point of less than 120° C., preferably less than 100° C. and more preferably less than 80° C.

This novel catalyst is particularly suitable for use in the process described in European patent EP-A-1 077 247.

Example 1

Preparation of Catalysts A, B, C and D (not In Accordance), E and F (In Accordance with the Invention)

Synthesis of Support

In the case of nickel, a high specific surface area alumina (Al-1) was used, supplied by Axens. This alumina was dry impregnated with an aqueous solution containing a suitable quantity of nickel nitrate. The quantity of nickel nitrate corresponded to a nickel content (oxide equivalent, NiO) of 4% by weight on the solid. After impregnation, the solid was left to mature at ambient temperature for 12 hours, then dried at 120° C. for 12 hours. Finally, the solid was calcined at 750° C. for two hours in a muffle furnace, this solid hereinafter being denoted AlNi.

In the case of cobalt, the same Al-1 alumina support supplied by Axens was used. This alumina was dry impregnated with an aqueous solution containing a suitable quantity of cobalt nitrate such that the Co content (oxide equivalent, CoO) was 4% by weight. After impregnation, the solid was left to mature at ambient temperature for 12 hours, then dried at 120° C. for 12 hours. Finally, the solid was calcined at 750° C. for two hours in a muffle furnace, this solid hereinafter being denoted AlCo-1. Another alumina, Al-2, supplied by Axens and with a proportion by volume of pores with a diameter of more than 0.1 microns was also impregnated with Co nitrate then calcined using the same method as for AlCo-2. The support obtained was denoted AlCo-2.

The properties of the alumina supports and the supports doped with Ni or Co are shown in Table 1 below. It will be seen that, in contrast to AlNi and AlCo-1, AlCo-2 was not in accordance with the invention due to its high (0.1 micron) volume fraction.

TABLE 1

Properties of supports Al-1, Al-2 and AlNi, AlCo-1 and AlCo-2 supports

|  | Al-1 | Al-2 | AlNi | AlCo-1 | AlCo-2 |
|---|---|---|---|---|---|
| SBET ($m^2$/g) | 264 | 150 | 147 | 144 | 90 |
| Total pore volume (Hg) $cm^3$/g | 0.61 | 0.92 | 0.51 | 0.50 | 0.75 |
| Pore volume (Hg) pores > 0.1 micron, $cm^3$/g | 0.13 | 0.41 | 0.07 | 0.08 | 0.32 |
| V (0.1 microns)/V total | 0.21 | 0.45 | 0.14 | 0.16 | 0.42 |
| NiO content, % by weight | / | / | 4.0 | / | / |
| CoO content, % by weight | / | / | / | 4.0 | 4.0 |

Synthesis of Catalysts A, B, C. D (not in Accordance with the Invention), E, F (in Accordance with the Invention)

Catalysts A, B, C, D, E and F were prepared using the dry impregnation method using the AlNi support. The synthesis protocol consisted of carrying out dry impregnation of a solution of ammonium heptamolybdate and nickel nitrate, the volume of the aqueous solution containing the metal precursors being equal to the water take-up volume corresponding to the mass of the support to be impregnated. The concentrations of the precursors in the solution were adjusted to deposit the desired amounts by weight of metal oxides on the support. The solid was then left to mature at ambient temperature for 12 hours, and dried at 120° C. for 12 hours. Finally, the solid was calcined at 500° C. for two hours in a stream of air (1 litre per gram hour). The characteristics of the prepared catalysts are shown in Table 2 below. The prepared catalysts were distinguished by their active phase content.

TABLE 2

Characteristics of catalysts A, B, C, D, E, F, in the oxide form

| | Catalyst | | | | | |
|---|---|---|---|---|---|---|
| | A | B | C | D | E | F |
| Wt % of $MoO_3$ | 5.0 | 7.9 | 10.0 | 11.3 | 12.0 | 14.0 |
| Wt % of NiO* | 1.2 | 1.5 | 2.2 | 2.2 | 2.5 | 2.6 |

TABLE 2-continued

Characteristics of catalysts A, B, C, D, E, F, in the oxide form

| | Catalyst | | | | | |
|---|---|---|---|---|---|---|
| | A | B | C | D | E | F |
| Ni/Mo ratio** | 0.48 | 0.37 | 0.43 | 0.38 | 0.4 | 0.36 |
| S(BET), $m^2/g$ | 143 | 138 | 133 | 131 | 133 | 127 |
| Hg pore vol, $cm^3/g$ | 0.48 | 0.47 | 0.47 | 0.45 | 0.45 | 0.43 |
| Hg pore vol, $cm^3/g$ (pores > 0.05 microns) | 0.16 | 0.15 | 0.15 | 0.14 | 0.14 | 0.14 |
| V (>0.05 microns) as % of total pore vol | 33% | 32% | 32% | 31% | 31% | 31% |
| Hg pore vol, cm3/g (0.004 micron < pores < 0.009 micron) and as % of total pore vol | 0.06 12.5% | 0.06 12.7% | 0.05 10.6% | 0.05 11.1% | 0.04 9% | 0.04 9.3% |

*corrected for quantity of NiO engaged in AlNi support
**excluding nickel used in AlNi support.

According to the porosity, specific surface area, amount of $MoO_3$ and the Ni/Mo mole ratio criteria (excluding nickel engaged in the AlNi support), catalysts E and F were thus in accordance with the invention; in contrast, catalysts A, B and C and D (lowest molybdenum contents) were not in accordance with the invention.

Evaluation of Catalysts

The activity of catalysts A, B, C, D (not in accordance), E and F (in accordance) was evaluated using a test for selective hydrogenation of a mixture of model molecules carried out in a stirred 500 ml autoclave reactor. Typically, between 2 and 6 g of catalyst was sulphurized at atmospheric pressure in a sulphurization unit in a mixture of $H_2S/H_2$ constituted by 15% by volume of $H_2S$ at 1 l/g.h of catalyst and at 400° C. for two hours (5° C./min ramp-up) followed by a constant temperature stage of 2 hours in pure hydrogen at 200° C. This protocol produced degrees of sulphurization of more than 80% for all of the catalysts of the invention. The sulphurized catalyst was transferred into the reactor, sealed from the air, then brought into contact with 250 ml of model feed at a total pressure of 1.5 MPa and a temperature of 160° C. The pressure was kept constant during the test by adding hydrogen. The feed used for the activity test had the following composition: 1000 ppm by weight of sulphur in the form of 3-methyl thiophene, 100 ppm by weight of sulphur in the form of propane-2-thiol, 10% by weight of olefin in the form of 1-hexene, in n-heptane.

The time t=0 of the test corresponded to bringing the catalyst and the feed into contact. The test duration was fixed at 45 minutes and gas chromatographic analysis of the liquid effluent obtained allowed an evaluation of the activities of the various catalysts for the hydrogenation of isoprene (formation of methylbutenes), the hydrogenation of 1-hexene (formation of n-hexane) and transformation of light mercaptans into heavier compounds (disappearance of chromatographic peak associated with propane-2-thiol) to be carried out. The activity of the catalyst for each reaction was defined with respect to the rate constant obtained for each reaction, normalized to one gram of catalyst. The rate constant was calculated by considering the reaction to be first order:

$$A(X)=k(X)/m$$

in which: A(X)=activity of catalyst for reaction X, in $min^{-1}/g$ of catalyst;
  k=rate constant for the reaction under consideration, in $min^{-1}$, calculated using the formula:

$$k(X)=(1/45)*\ln(100/(100-\text{conv}(X)))$$

in which 45=duration of test in minutes;
  Conv(X) conversion of compound X; X=isoprene or propane-2-thiol or 1-hexene;
  m=mass of catalyst (oxide form) used in test;
  X: reaction under consideration
  X=isoprene: hydrogenation of isoprene
  X=1-hexene: hydrogenation of 1-hexene
  X=propane-2-thiol: conversion of propane-2-thiol.

The selectivity of the catalyst towards isoprene hydrogenation is equal to the ratio of the activities of the catalyst in the hydrogenation of isoprene and 1-hexene: A(isoprene)/A(1-hexene).

The results obtained for the various catalysts are shown in Table 3 below.

TABLE 3

Performances of catalysts in model molecule test

| | Catalyst | | | | | |
|---|---|---|---|---|---|---|
| | A | B | C | D | E | F |
| A(isoprene)* $10^3$ | 2.5 | 3.3 | 3.7 | 4.4 | 4.6 | 4.6 |
| A(1-hexene)* $10^3$ | 0.015 | 0.018 | 0.020 | 0.025 | 0.027 | 0.028 |
| A(isoprene)/ A(1-hexene) | 167 | 183 | 185 | 176 | 170 | 164 |
| A(propane-2-thiol)*$10^3$ | 13.0 | Infinite* | Infinite* | Infinite* | Infinite* | Infinite* |

*complete conversion of propane-2-thiol.

It can be seen that all of the catalysts were highly selective as regards the diolefin hydrogenation reaction. These catalysts could thus substantially hydrogenate isoprene without significantly hydrogenating 1-hexene.

It can also be seen that under the test conditions, conversion of light mercaptans was complete for all of the catalysts apart from catalyst A, which had less of the active phase.

In the case of catalysts B, C, D, E and F, an infinite activity meant complete conversion of propane-2-thiol.

In contrast, only catalysts E and F of the invention had a maximum isoprene hydrogenation activity.

It thus appears that the catalysts of the invention are capable of simultaneously carrying out selective hydrogenation of the diolefin with simultaneous conversion of the light mercaptan.

Example 2

Influence of Degree of Sulphurization

Catalyst E described above was evaluated in the same model molecule test but without the prior sulphurization step. The degree of sulphurization of the solid was thus zero. The reduction in the temperature of the constant temperature stage with the $H_2S/H_2$ mixture (from 400° C. to typically 100° to 150° C.) during the catalyst sulphurization protocol on the sulphurization bench could also produce intermediate degrees of sulphurization for catalyst E. Table 4 records the catalytic results obtained on said catalyst as a function of its degree of sulphurization. It can be seen that prior sulphurization of the catalyst had a major beneficial effect on the activity of the catalyst in the hydrogenation of isoprene and in the conversion of propane-2-thiol, as well as on its selectivity.

TABLE 4

Performance of catalyst E as a function of its degree of sulphurization

|  | E, non sulphurized | E, sulphurized | | |
| --- | --- | --- | --- | --- |
|  | Degree of sulphurization, %* | | | |
|  | 0 | 35 | 68 | 83 |
| A(isoprene)*$10^3$ | 0.5 | 2.1 | 3.6 | 4.6 |
| A(1-hexene)*$10^3$ | 0.012 | 0.012 | 0.019 | 0.027 |
| A(isoprene)/A(1-hexene) | 41 | 175 | 189 | 170 |
| A(propane-2-thiol)*$10^3$ | 5.0 | Infinite** | Infinite** | Infinite** |

*The nickel engaged in the AlNi support is not included
**total conversion of propane-2-thiol Example 3

Influence of Ni/Mo Mole Ratio

In this example, catalysts G and H were prepared using the operating protocol described in Example 1. These catalysts only differed substantially from catalyst E in their nickel contents, and thus in the Ni/Mo mole ratio (Table 5). Thus, they were not in accordance with the invention.

TABLE 5

Characteristics of catalysts G and H in the oxide form

|  | Catalyst | |
| --- | --- | --- |
|  | G | H |
| Wt % of $MoO_3$ | 12.2 | 12.0 |
| Wt % of NiO | 0.9 | 8.7 |
| Ni/Mo mole ratio* | 0.14 | 1.39 |
| S(BET), $m^2/g$ | 132 | 120 |
| Total pore vol, $cm^3/g$ | 0.46 | 0.41 |
| Hg pore vol, $cm^3/g$ (pores > 0.05 microns) and as % of total pore volume | 0.14 30% | 0.12 29% |

*excluding nickel used in AlNi support

As before, catalysts G and H were evaluated in the same model molecule test. For these catalysts, the sulphurization protocol which was adopted could produce degrees of sulphurization of more than 80%. These catalysts were compared with catalyst E, which had a Ni/Mo mole ratio of 0.40, falling within the preferred range (Table 6).

TABLE 6

Performance of catalysts E, G and H in a model molecule test

|  | Catalyst | | |
| --- | --- | --- | --- |
|  | E | G | H |
| Degree of sulphurization, % | 83% | 86% | 88% |
| A(isoprene)*$10^3$ | 4.6 | 1.2 | 4.7 |
| A(1-hexene)*$10^3$ | 0.027 | 0.009 | 0.030 |
| A(isoprene)/A(1-hexene) | 170 | 133 | 157 |
| A(propane-2-thiol)*$10^3$ | Infinite* | 9.7 | Infinite* |

*total conversion of propane-2-thiol

It will be observed that catalyst G (Ni/Mo ratio of 0.14) had a lower isoprene hydrogenation activity and propane-2-thiol conversion than catalyst E of the invention. It will also be observed that the large increase in the nickel content (catalyst H, Ni/Mo ratio of 1.39) led, compared with catalyst E, to a slight increase in the activity for mono-olefin hydrogenation to the detriment of diolefins hydrogenation, with the A(isoprene)/A(1-hexene) selectivity dropping. In contrast, the isoprene hydrogenation activity was not significantly affected by an increase in the nickel content.

Example 4

Influence of Macropore Volume in the Range 10% to 40% of Total Pore Volume

Catalysts I, J and K were prepared using step 2 of the catalyst preparation process, using different alumina supports Al-3, Al-4 and Al-5 supplied by Axens the properties of which are shown in Table 7 below.

TABLE 7

Properties of supports Al-3, Al-4, Al-5

|  | Al-3 | Al-4 | Al-5 |
| --- | --- | --- | --- |
| SBET ($m^2/g$) | 124 | 143 | 293 |
| Total pore volume (Hg) $cm^3/g$ | 0.72 | 1.10 | 0.75 |
| Pore volume (Hg) pores > 0.1 micron, $cm^3/g$ | 0.08 | 0.32 | 0.01 |
| V(0.1 micron pores), % of total pore volume | 11% | 29% | 1% |
| Pore volume (Hg) pores > 0.05 microns, $cm^3/g$ | 0.17 | 0.47 | 0.03 |
| V(0.05 micron pores), % of total pore volume | 24% | 43% | 4% |

Catalysts L and M were prepared using the protocol described in example 1 using alumina supports Al-3, Al-4 and Al-5 the properties of which are shown in Table 1.

The characteristics of these catalysts and that of catalyst E are shown in Table 8 below.

NiMo/AlCo catalyst L, in accordance with the invention, was prepared using the protocol described in Example 1, employing the AlCo-1 support.

NiMo/AlCo catalyst M, not in accordance with the invention, was prepared using the protocol described in Example 1 employing the AlCo-2 support.

Catalyst I was not in accordance with the invention as the Al-3 alumina support had not been passivated in advance by the nickel (no nickel oxide, which interacts strongly with alumina). Similarly, catalysts J and K were not in accordance with the invention as the Al-4 and Al-5 alumina supports had not been passivated by nickel in advance and their respectively too high and too low macroporous volume.

TABLE 8

Characteristics of catalysts E, I, J, K, L and M

| | Catalyst | | | | | |
|---|---|---|---|---|---|---|
| | E | I | J | K | L | M |
| Wt % of MoO$_3$ | 12.0 | 12.1 | 12.3 | 12.1 | 12.0 | 12.1 |
| Wt % of NiO | 2.5* | 2.5 | 2.5 | 2.2 | 2.4 | 2.5 |
| Weight % of CoO | / | / | / | / | 3.4 | 3.4 |
| S(BET), m$^2$/g | 133 | 106 | 116 | 278 | 128 | 82 |
| Total pore volume, (Hg), cm$^3$/g | 0.45 | 0.58 | 1.00 | 0.65 | 0.44 | 0.65 |
| Pore volume (Hg), cm$^3$/g (pores > 0.05 micron) | 0.14 | 0.16 | 0.45 | 0.02 | 0.15 | 0.35 |
| Pore volume (Hg), cm$^3$/g (pores > 0.1 micron) | 0.11 | 0.08 | 0.31 | 0.01 | 0.10 | 0.28 |
| Volume (pores > 0.05 micron), as % of total pore volume | 31% | 28% | 45% | 3% | 34% | 54% |
| Volume (pores > 0.1 micron), as % of total pore volume | 25% | 14% | 31% | 2% | 23% | 43% |
| SPD (g/cm$^3$)** | 0.87 | 0.69 | 0.48 | 0.59 | 0.85 | 0.63 |
| Hg pore vol, cm3/g (0.004 micron < pores < 0.009 micron) and as % of total pore vol | 0.04 9% | 0.01 2% | 0.01 1% | 0.35 54% | 0.04 9% | 0.02 3% |

*the amount of nickel engaged in the AlNi support was not taken into account
**Settled packing density The settled packing density (SPD) corresponds to the maximum quantity of catalyst in a given volume and is normalized to grams of catalyst per cubic centimetre. This was evaluated using a RETSCH AS 200 control vibrator and a measuring cylinder of known volume and diameter adapted to the granulometry of the products (the diameter of the measuring cylinder must be 10 times that of the particles). After calibrationr, the measuring cylinder, with volume V, was filled with the test product on the vibrator. Vibration was maintained for 3 minutes at an amplitude of 0.03 inches, keeping the level constant by adding product. At the end of settling, the surface of the product was skimmed level with the upper part of the sample and the mass of the full measuring cylinder was weighed. The SPD was then obtained by dividing the mass, corrected for the loss on ignition of the catalyst, by the volume of the measuring cylinder. In general, the lower the porosity of the catalyst, the greater will be the charging density. These catalysts were tested on a total catalytic cracking gasoline the characteristics of which are provided in Table 8 below. The conjugated diolefins content was determined based on the reaction of conjugated dienes with maleic anhydride in accordance with the Diels-Alder reaction. The MAV (maleic anhydride value) was proportional to the amount of diolefin present and was determined using the standard IFP method: method 9407. The MAV was expressed in milligrams of maleic anhydride reacted per gram of sample. The IFP9407 method is similar to the standardized 326-82UOP method which provides the DV (diene value), the two values being linked by the relationship MAV=3.86 DV. The amount of aromatics and olefins in the feed and the effluent were quantified by chromatography. The light mercaptans of the feed and effluent were quantified by chromatography. The equipment used was a HP5890 Series II (Agilent Technologies) chromatograph coupled to a specific detector, a 355 (Sievers Inc., Boulder, Colo., USA). The column used was a non-polar PONA (50 m, 0.2 mm, 0.20 microns) column. The operating conditions were derived from the ASTM D 5623 standard method and the sulphur-containing compounds were identified by comparison with the retention times for reference sulphur-containing compounds.

TABLE 8

Characteristics of total catalytically cracked gasoline

| | |
|---|---|
| S content | 3460 ppm |
| Light mercaptans*, S content | 116 ppm |
| MAV | 17.5 |
| Aromatics content | 36.5% by weight |
| Olefins content | 34.4% by weight |
| ASTM distillation | 5% point: 30° C. |
| | 95% point: 233° C. |

*methanethiol, ethanethiol and propanethiols

The following protocol was used to evaluate the catalysts on a real feed. 50 cm$^3$ of catalyst was sulphurized in a mixture of n-heptane +4% DMDS (dimethyldisulphide)/H$_2$, the H$_2$/sulphurization feed volume ratio being 500 normal litres/litre of feed (N/l/l) and the HSV of the sulphurization feed being 2 h$^{-1}$ (volume of sulphurization feed per volume of catalyst per hour). The temperature ramp-up was 1° C./min to a constant temperature stage of 350° C. The constant temperature stage lasted 4 hours. The temperature was then dropped to 120° C., the sulphurization feed was replaced with pure n-heptane for 4 hours, then the FCC gasoline was injected and the operating conditions were adjusted to the desired values. The test operating conditions were as follows: total pressure=2.5 MPa, H$_2$/feed ratio=6 Nl/l, HSV=3 h$^{-1}$. The catalysts were evaluated at 140° C. and at 160° C., the duration of each constant temperature stage being adjusted as a function of the stabilization period of the catalyst, evaluated by regular analyses of the MAV of the effluent.

Figure 2:
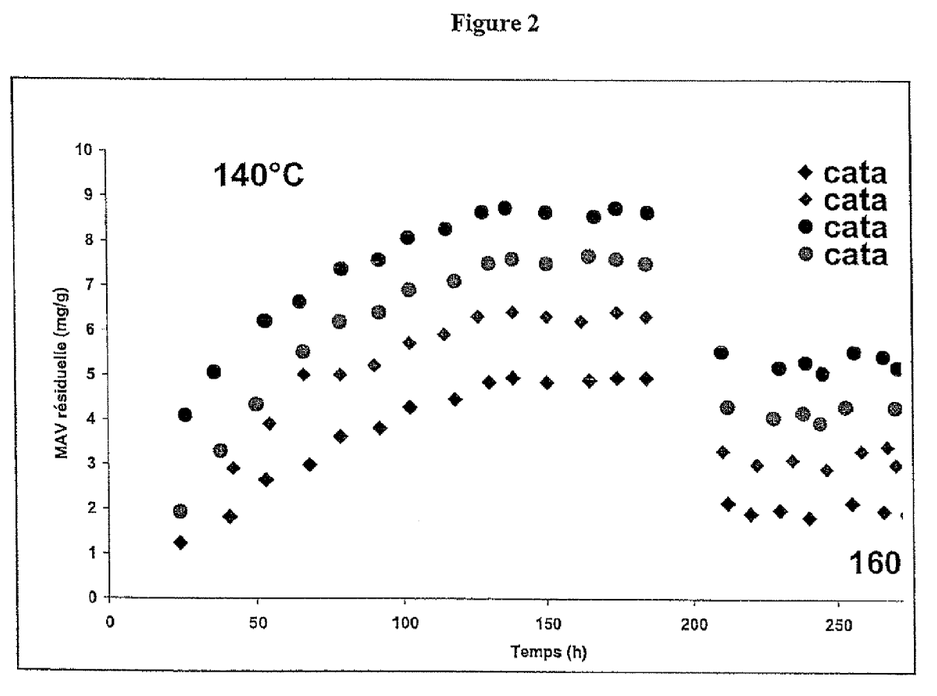
FIGS. 2 and 3 are graph showing the residual MAV to the effluent and a function of time for various catalysts.

The change in the residual MAV of the effluent as a function of time for the catalysts E, I, J and K is shown in FIG. 2.

It can be seen that catalyst E, in accordance with the invention, eliminated diolefins most effectively at 140° C. and 160° C. since the residual MAV obtained was the lowest. Catalyst J, characterized by too high a pore volume, had a substantial hydrogenating activity deficit. Catalyst K initially had an activity which was comparable with catalyst I, but had a lower crush resistance and thus greater deactivation. Residual carbon analyses of the used catalysts after extraction with toluene showed that the carbon content in catalyst K was about twice as high as the carbon content in catalyst E. For the set of catalysts, under the selected operating conditions, olefin hydrogenation remained marginal and below 2%.

Figure 3:
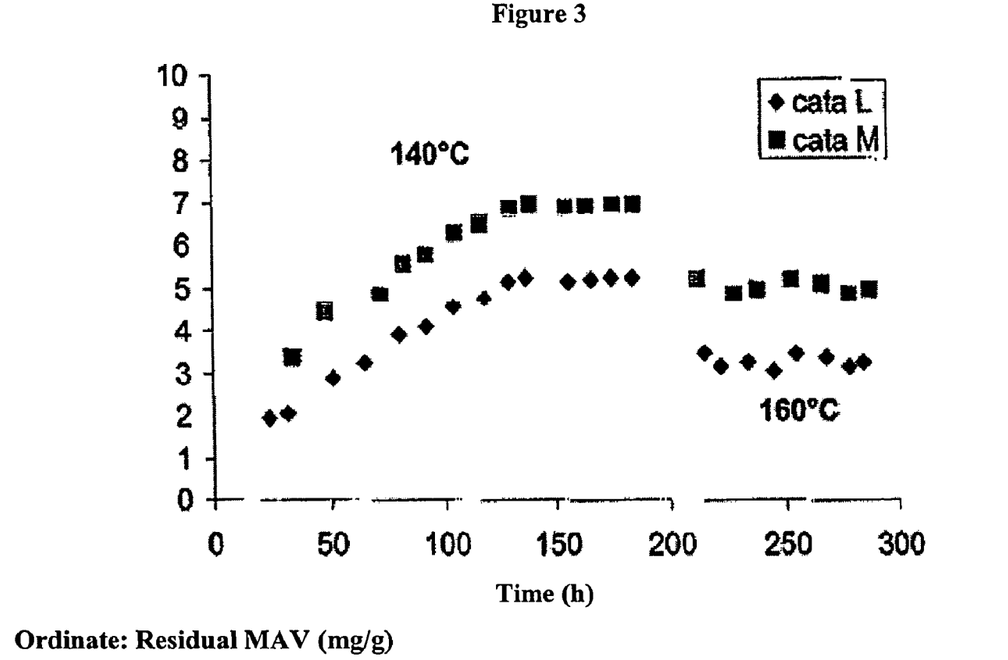

Catalysts L and M were evaluated using the same feed and under the same operating conditions as those used for catalyst E, I, J and K. FIG. 3 shows the change in MAV as a function of time for catalysts L and M.

It can be seen that catalyst M, not in accordance with the invention, had a lower activity compared with catalyst L, which was in accordance. Further, as regards the activity of catalyst L, it was very similar to catalyst E, which was also in accordance. For this test too, olefin hydrogenation remained marginal and below 2%.

Table 9 shows the change in the conversion of light mercaptans for the 6 catalysts at each temperature after catalyst stabilization (last part of each stage). It can be seen that under the selected operating conditions, all of the catalysts converted the light mercaptans of the feed to a large extent, said conversion being complete for catalysts E, I, L and M at 160° C. In contrast, it can be seen that catalysts E and L, which were in accordance with the invention, were more effective in eliminating light mercaptans at 140° C.

TABLE 9

Conversion of light mercaptans at 140° C. and 160° C. obtained with catalysts E, I, J, K, L and M

|  | Conversion at 140° C. | Conversion at 160° C. |
|---|---|---|
| Catalyst E | 97% | 100% |
| Catalyst I | 94% | 100% |
| Catalyst J | 89% | 95% |
| Catalyst K | 90% | 96% |
| Catalyst L | 96% | 100% |
| Catalyst M | 93% | 100% |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 05/13.173, filed Dec. 22, 2005, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process comprising selectively hydrogenating a gasoline containing polyunsaturated compounds and saturated light sulphur-containing compounds, whereby the polyunsaturated compounds are hydrogenated into mono-unsaturated compounds and whereby, jointly, the saturated light sulphur-containing compounds are transformed into heavier compounds by reaction with the unsaturated compounds contained in the gasoline, wherein the reactions are conducted in contact with a catalyst comprising one or more metals from group VIB including at least molybdenum, and at least one non-noble metal from group VIII including at least nickel, deposited on a catalyst support comprising a metal aluminate of the formula $MAl_2O_4$ in which the metal M is at least one of nickel and cobalt and such that the quantity of metal M which interacts strongly with the support is in the range 0.5% to 10% by weight of oxide equivalent, and in which:

the amount, by weight of oxide, of the group VIB metal(s) is greater than 12% by weight with respect to the total catalyst weight;

the amount, by weight of oxide, of the group VIII metal(s) is less than 15% by weight with respect to the total catalyst weight;

the metals in said catalyst have a degree of sulphurization of at least 60%;

the volume of pores with a diameter of more than 0.05 microns in the catalyst is in the range 10% to 40% of the total pore volume of the catalyst; and the mole ratio between the non-noble group VIII nickel metal and the group VIB molybdenum metal, Ni/Mo, is in the range of 0.25 to 0.45 mol/mol.

2. A process according to claim 1, in which the catalyst comprises an amount of the oxide of the group VIII element in the range of 1% to 10% by weight with respect to the catalyst weight.

3. A process according to claim 1, in which the degree of sulphurization of the constituent metals of said catalyst is more than 80%.

4. A process according to claim 1, in which the catalyst has a total pore volume in the range of 0.3 $cm^3/g$ to 0.7 $cm^3/g$.

5. A process according to claim 4, in which the catalyst has a total pore volume in the range of 0.35 $cm^3/g$ to 0.65 $cm^3/g$.

6. A process according to claim 1, in which the volume of pores of the catalyst with a diameter of more than 0.1 microns is in the range of 5% to 35% of the total pore volume.

7. A process according to claim 6, in which the volume of pores of the catalyst with a diameter of more than 0.1 micron is in the range of 10% to 30% of the total pore volume.

8. A process according to claim 1, in which the volume of pores of the catalyst with a diameter of more than 0.05 micron represents 15% to 35% of the total pore volume.

9. A process according to claim 1, in which the catalyst has a specific surface area of less than 250 $m^2/g$.

10. A process according to claim 1, in which the support comprises an aluminate of the formula $MAl_2O_4$ in which metal M is nickel.

11. A process according to claim 10, in which the quantity of metal M which interacts strongly with the support is in the range of 0.7% to 8% of the oxide equivalent weight.

12. A process according to claim 11, in which the quantity of metal M which interacts strongly with the support is in the range of 1% to 5% of the oxide equivalent weight.

13. A process according to claim 11, in which a maximum of 40% of the quantity of metal used in the step for synthesizing the support is in weak interaction with said support.

14. A process according to claim 13, in which a maximum of 30% of the quantity of metal used in the step for synthesizing the support is in weak interaction with said support.

15. A process according to claim 13, in which a maximum of 25% of the quantity of metal used in the step for synthesizing the support is in weak interaction with said support.

16. A process according to claim 10, in which the catalyst support has a pore volume in the range of 0.3 to 0.7 cm$^3$/g.

17. A process according to claim 16, in which the catalyst support has a pore volume in the range of 0.35 to 0.65 cm$^3$/g.

18. A process according to claim 10, in which the volume of pores of the support with a diameter of more than 0.1 microns represents 5% to 35% of the total pore volume.

19. A process according to claim 18, in which the volume of pores of the support with a diameter of more than 0.1 microns represents 5% to 30% of the total pore volume.

20. A process according to claim 10, in which the volume of pores of the support with a diameter of more than 0.05 microns represents 5% to 50% of the total pore volume.

21. A process according to claim 20, in which the volume of pores of the support with a diameter of more than 0.05 microns represents 10% to 40% of the total pore volume.

22. A process according to claim 1, in which the catalyst contains a nickel oxide content in the range of 1% to 10% by weight with respect to the total catalyst weight, and a molybdenum oxide content of more than 12% by weight with respect to the total catalyst weight, the metals being deposited on a support comprising a nickel aluminate so that the quantity of metal M in strong interaction with the support is in the range of 1% to 5% by weight of the metal oxide with respect to the total catalyst weight, the degree of sulphurization of the metals constituting the catalyst being more than 80% and the volume of pores of said catalyst with a diameter of more than 0.05 microns being in the range of 15% to 35%.

23. A process according to claim 1, in which the gasoline is brought into contact with the catalyst at a temperature in the range of 80° C. to 220° C. with a liquid hourly space velocity in the range of 1 h$^{-1}$ to 10 h$^{-1}$ and at a pressure in the range of 0.5 to 5 MPa.

\* \* \* \* \*

UNITED STATES PATENT AND TRADEMARK OFFICE
CERTIFICATE OF CORRECTION

PATENT NO. : 7,736,492 B2
APPLICATION NO. : 11/642974
DATED : June 15, 2010
INVENTOR(S) : Bouchy et al.

Page 1 of 1

It is certified that error appears in the above-identified patent and that said Letters Patent is hereby corrected as shown below:

Column 18, line 56 reads "comprises an aluminate of the formula MA1204 in which" should read -- comprises an aluminate of the formula $MAl_2O_4$ in which --

Signed and Sealed this

Sixteenth Day of November, 2010

David J. Kappos
*Director of the United States Patent and Trademark Office*